2,765,699

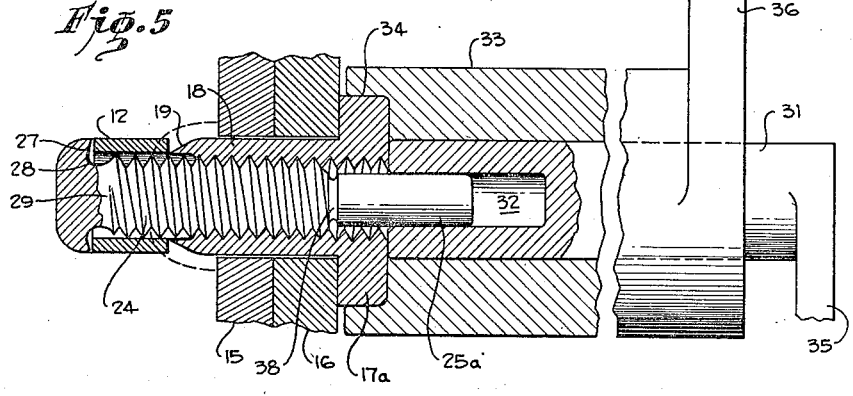
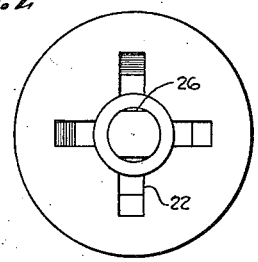
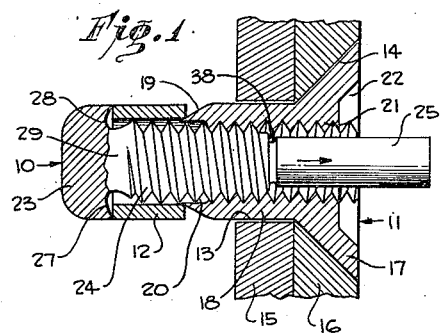
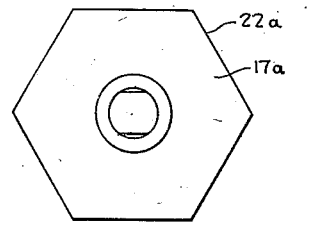
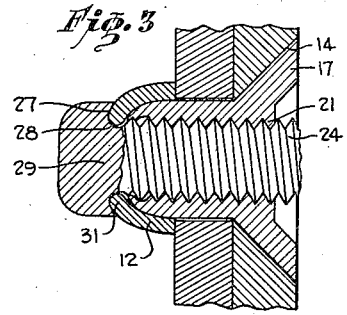
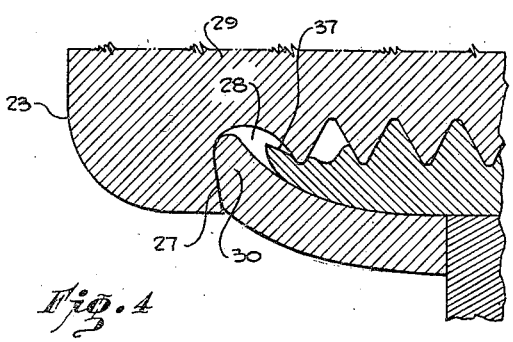
INVENTOR.
JOSEPH LA TORRE
BY Lynn H. Latta
ATTORNEY

United States Patent Office 2,765,699
Patented Oct. 9, 1956

BLIND BOLT UTILIZING DISTORTABLE COLLAR AND DEFORMABLE LOCKING NUT MEMBER

Joseph La Torre, Sunland, Calif.

Application August 9, 1952, Serial No. 303,523

3 Claims. (Cl. 85—40)

This invention relates to fasteners of the type commonly referred to as "blind" fasteners, characterized generally by having a head at one end of an unheaded shank adapted to be extended through registering openings in members to be secured together, and having provision for manipulation of the headed end of the fastener so as to form a secondary head on the unheaded shank, whereby the two heads may cooperate to secure the apertured members together.

The present invention relates particularly to a nut and bolt combination including a nut having a head and a bolt having a head, a threaded shank and a stem, the nut head and bolt stem being located at the same end of the fastener and simultaneously engageable by a nut running tool, the opposite end of the fastener having means for forming a head in opposed relation to the head of the nut as the result of relative rotation and consequent threading action between the nut and bolt.

The principal object is to provide a novel and improved fastener of the character referred to having means for locking the nut and bolt together against unthreading movement.

A further object is to provide a novel and improved fastener of the character referred to embodying an expandable collar for forming the secondary head thereof, which collar is drawn axially by the head of the bolt over an expander cone forming part of the nut, to deform the outer end thereof into engagement with the bolt, whereby to establish a lock between the bolt and the nut.

Other objects will become apparent in the ensuing specifications and appended drawings in which:

Fig. 1 is an axial sectional view of a fastener embodying the invention, in its original form, inserted through registering openings in plate members to be secured together;

Fig. 2 is an end view of the headed end thereof;

Fig. 3 is an axial view of the same, with the secondary head fully formed, the nut locked to the bolt and the stem of the bolt broken off;

Fig. 4 is an enlarged fragmentary detail sectional view of the same, illustrating the locking feature;

Fig. 5 is an axial sectional view of a fastener embodying a modified form of the invention and illustrating a nut running tool applied thereto; and Fig. 6 is an end view of the headed end of the fastener of Fig. 5.

As an example of one form in which the invention may be embodied I have shown in Figs. 1–4 inclusive a blind fastener embodying three elements, namely, the bolt 10, a nut 11 and a collar 12 for forming a secondary head on the shank end of the fastener after said shank end has been inserted through registering openings 13 and 14 in members 15 and 16 (e. g. plate or sheet members) to be secured together. In this particular embodiment of the invention, the nut 11 has a conical head 17 and the opening 14 is countersunk to receive the head 17 in flush relation to the outer face of plate member 16.

Nut 11 further includes a sleeve body 18 having a cylindrical outer wall of a diameter just slightly less than the diameter of opening 13, the forward end of sleeve body 18 being externally bevelled to provide an expander cone 19, tapering from said outer wall down to a thin annular yieldable tip at the forward extremity of a cylindrical countersink 20 in the forward end thereof. Rearwardly of countersink 20, the nut 11 is provided with internal threads 21 extending to the rear face of head 17. Head 17 is provided with a plurality of wrenching recesses 22 to receive the jaws of a suitable screw driver or wrenching bit, forming part of a wrenching tool.

Bolt 10 has a head 23 to engage the outer end of collar 12, a threaded shank 24 which is threaded into the internal thread 21 of the nut 11, and a stem 25 which is provided with wrenching surfaces 26 (Fig. 2) for engagement by a wrenching tool, for rotating the bolt while the nut is held stationary (or for holding the bolt stationary while the nut is rotated).

The sleeve 11, collar 12 and head 23 all have an external diameter which is preferably the same for each, but in any event is such that these three elements cooperatively define a fastener body which may be readily passed through openings 13, 14.

Where it meets the threaded body portion 24, head 23 has a recessed bearing face 27, preferably of frustoconical form, for engaging the outer end of collar 12. The inclination of bearing face 27 is sufficient so that in the final stage of wrenching operation in which the axial loads developed between head 23 and collar 12 have risen to approach a maximum value, the outer end of collar 12 is deformed inwardly into an annular groove 28 between bearing face 27 and the threaded body portion 24 of the bolt, said groove being defined as the surface of a reduced neck 29 which joins head 23 to threaded shank 24. The inturned end of the collar is indicated at 30.

The cylindrical countersink 20 and the forward end of the nut provides in the cone 19 a forward portion of uniform triangular axial section throughout the full circumference thereof, having the form of a thin edge which is yieldable so that it can be readily and uniformly contracted by the outer end of collar 12 as the latter is deformed inwardly by shoulder 27.

Figs. 5 and 6 illustrate a modified form of the invention in which the flat head 17a, with polygonal periphery 22a, is substituted for the conical head 17 with its wrenching recesses 22. Fig. 5 also illustrates how the head of the nut and the stem 25 are engaged simultaneously by relatively rotatable parts of a common wrenching tool. Such tool may, for example, comprise an inner shaft member 31 having a socket 32 to fit the slotted stem 25, and a sleeve portion 33 having a socket 34 to fit the polygonal rim 22a of nut head 17a. The tool for running the nut on the fastener of Figs. 1–4 is the same except for the substitution of screw driver jaws to fit recesses 22, instead of the socket 34. Merely as a schematic indication of means for transmitting rotation to one of the tool members while holding the other against rotation, I have indicated handle or crank members 35 and 36 respectively on the respective tool elements 31 and 33.

In the operation of setting the fastener, the shank end thereof is inserted through openings 13, 14 in the members 15, 16, and the tool is then applied to the fastener and operated to rotate either the bolt or the nut while holding the other against rotation. Rotation is in the direction to draw the bolt into the nut as indicated by the arrow in Fig. 1, whereby the head 23 becomes operative to push the collar 12 against expander cone 19, causing the collar to expand over the cone 19 until the inner end of the collar contacts the member 15. Since the collar can no longer move axially with reference to the nut, additional rotation of the bolt 10 will force the undercut shoulder 27 against the outer end of the collar, deforming the same inwardly into groove 28 as indicated in Fig. 4. Accordingly, the outer end portion of the collar 12 will be pressed inwardly against the unthreaded forward extremity of cone 19, clinching the latter inwardly into annular groove 28, to form an inturned flange 37. The flange 37, being formed against the annular surface of groove 28, will be a circumferentially continuous flange (i. e., will not be in the form of an internal thread), will overhang the end portion of the threaded body 24, and will be incapable of following the thread groove for unthreading movement. Annular groove 28 may be of toroidal shape, the word "toroidal" being used here to designate an annular shape having a curved axial cross-section. Such cross-section may have a substantially semi-circular curvature, as shown in Fig. 4. In any event, groove 28 is annular, with an axial section which is uniform throughout its circumference. Stated differently, the neck 29 has a uniformly circular shape in any cross section thereof along the axial extent of groove 28, such as would be developed by turning the bolt blank on an automatic lathe or screw machine, prior to threading the body 24. Accordingly, flange 37 becomes a circumferentially continuous locking device securely locking the nut against unthreading movement relative to the bolt. The only way in which unthreading could occur would be for the flange 37 to be again deformed outwardly through a portion of its circumference, so as to provide therein a thread groove to receive the thread of body 24.

The inturned end 30 of collar 12 likewise becomes a locking device under some circumstances. For example, if the portion of cone 19 which is turned inwardly, is so slight as to be a mere feather edge which will readily yield to unthreading pressure, the inturned collar end 30 will, upon a slight unthreading movement, move into engagement with the end of threaded body 24, thus locking the nut against further unthreading. The same will happen in a case where the combined thickness of members 15 and 16 may be such that the fastener may be cinched without the tip of the cone 19 passing the end of the threaded body 24. Under such conditions, the tip of the cone would not be formed into a circumferentially continuous flange reaching into groove 28. In this connection, it will be understood that, while the fasteners will be provided in a range of sizes (lengths) the number of sizes that can be feasibly provided, is limited, and each fastener must accommodate a range of aggregate thicknesses of the members to be secured together.

In the adaptation of the fastener to thickness of members 15, 16, the extent to which the cone 19 will project into groove 28 when cinching begins, may vary from a point where cone 19 touches shoulder 27, to a point where it projects only slightly beyond the end of threaded body 24, the range of adaptation thus being normally within the width of groove 28. However, there may be some styles of fasteners for which the quantities demanded may be sufficiently small to call for a wider range of coverage in a single fastener size, or there may be cases where a shortage in the correct size makes it necessary to temporarily resort to a smaller size. Under such conditions, the utilization of the collar as the locking means, becomes important. In executing this function, the collar hugs the sleeve 18 with a tight grip as the result of the tension existing in the collar after it has been expanded over the cone 19. Thus the collar in effect becomes an extension of the nut, seated in groove 28 to effect the lock.

The stem 25, as indicated in Fig. 1, is preferably formed simply by flatting diametrically opposed sides of threaded body 24, leaving sections of the threads at opposite sides of the stem. Alternatively, it may be turned down so as to have smooth sides all around, as shown in Fig. 5 at 25a. In each case the stem is provided with a necked-down section 38 joining it to the threaded body 24, and providing for twisting off the stem when the torque has risen to a maximum value.

I claim:

1. A blind fastener comprising: a bolt including a shank having an external thread, a head at one end of said shank, and a stem at its other end provided with wrenching surfaces, said shank having a reduced neck joining the threaded portion thereof to said head and defining an annular groove between said head and threaded portion, the bottom of said groove being below the major diameter of said thread, said head having, adjacent said shank, an annular recessed bearing face extending at an acute angle to the bolt axis from the outer diameter of the head to a diameter inwardly of the outer diameter of said shank and merging with the surface of said groove; a one-piece nut threaded on the shank, said nut including an intermediate sleeve body, an expander cone at its end adjacent the bolt head, said cone having a conical external expander surface flaring toward and merging smoothly with the outer surface of said sleeve body and having a yieldable tip, and a head at the other end of said nut having driving means; and a generally cylindrical tubular collar of substantially uniform wall thickness from end to end, closely surrounding said shank and axially interposed between said bolt head and said expander tip; said bolt head, nut body and collar having substantially equal outer diameters such as to be received with substantially equal clearances in registering openings in members to be fastened together; the width of said annular groove, as measured from the periphery of said bearing face to the beginning of said shank thread, being less than the maximum combined radial thickness dimensions of said sleeve body and collar; said bearing face functioning, in the driving of said fastener, to force said collar over said cone to expand the collar into a secondary head engaging one of said members while the nut head engages the other member, to deflect the adjoining end of said collar into the recess of said head and into said annular groove, and to develop wedging action between said collar and said cone tip whereby to contract said cone tip to effect a locking grip thereof upon said shank.

2. A blind fastener comprising: a bolt including a shank having an external thread, a head at one end of said shank, and a stem at its other end provided with wrenching surfaces, said shank having a frangible section joining said stem and said threaded portion for determining the setting torque for the fastener, and for effecting parting of the stem from the shank at the end of the setting operation, said shank also having a reduced neck joining the threaded portion thereof to said head and defining an annular groove between said head and threaded portion, the bottom of said groove being below the major diameter of said thread, said head having, adjacent said shank, an annular recessed bearing face extending at an acute angle to the bolt axis from the outer diameter of the head to a diameter inwardly of the outer diameter of said shank and merging with the surface of said groove; a one-piece nut threaded on the shank, said nut including an intermediate sleeve body, an expander cone at its end adjacent the bolt head, said cone having a conical external expander surface flaring toward and merging smoothly with the outer surface of said sleeve body and having a yieldable tip, the end portion of which is less than half the radial thickness of said collar, and a head at the other end of said nut having driving means; and a generally cylindrical tubular collar of substantially uniform wall thickness from end to end, closely surrounding said shank and axially interposed between said bolt head and said expander tip; said bolt head, nut body and collar having substantially equal outer diameters such as to be received with substantially equal clearances in registering openings in members to be fastened together; the width of said annular groove, as measured from the periphery of said bearing face to the beginning of said shank thread, being less than the maximum combined radial thickness dimensions of said sleeve body and collar; said bearing face functioning, in the driving of said fastener, to force said collar over said cone to expand the collar into a secondary head engaging one of said members while the nut head engages the other member, to deflect the adjoining end of said collar into the recess of said head and into said annular groove, and to develop wedging action between said collar and said cone tip whereby to contract said cone tip to effect a locking grip thereof upon said shank.

3. A blind fastener comprising: a bolt including a shank having an external thread, a head at one end of said shank, and a stem at its other end provided with wrenching surfaces extending along the length thereof, a frangible reduced section joining said stem to the threaded portion of said shank, providing for parting of said stem from said shank at the end of a setting operation and determining the setting torque for the fastener, and a reduced neck joining said head to said shank and having a surface of smaller diameter than the major thread diameter of said shank, whereby an annular groove is defined between said head and shank, said head having, adjacent said shank, an annular, recessed bearing face including a frusto-conical portion extending uninterruptedly from the outer diameter of the head to a radius near the bottom of said groove at an acute angle to the shank axis and a junction portion of curved section tangent to said frusto-conical portion and merging smoothly with said neck surface; a one-piece nut threaded on the shank, said nut including an intermediate sleeve body, including at one end an annular expander cone facing said bolt head, said cone having a frusto-conical external expander surface flaring toward and merging smoothly with the outer surface of said sleeve body and having an end-countersink cooperating with said expander surface to define a thin, yieldable annular tip extending uninterruptedly throughout a full circumference, and including, at the other end of said nut, a head having driving means in adjacent relation to said wrenching surfaces of the stem throughout the range of advancement of the nut on said shank in the setting operation; and a generally cylindrical tubular collar of stretchable metal and of substantially uniform wall thickness from end to end, closely surrounding said shank and axially interposed between said bolt head and said expander tip; said bolt head, nut body and collar having substantially equal outer diameters such as to be received with substantially equal clearances in registering openings in members to be fastened together, said bearing face functioning, in the driving of said fastener, to force said collar over said cone to expand the collar into a secondary head engaging one of said members while the nut head engages the other member, to deflect the adjoining end of said collar into the recess of said head and into said annular groove, and to develop a wedging action between said collar and said cone tip whereby to contract said cone tip to effect a locking grip thereof upon said shank.

References Cited in the file of this patent

UNITED STATES PATENTS

| | | |
|---|---|---|
| 1,523,146 | Stevenson | Jan. 13, 1925 |
| 2,030,168 | Miller | Feb. 11, 1936 |
| 2,099,678 | Curtis | Nov. 23, 1937 |
| 2,282,711 | Eklund | May 12, 1942 |
| 2,319,376 | Wallace | May 18, 1943 |
| 2,403,330 | Benton | July 2, 1946 |
| 2,408,559 | Keating | Oct. 1, 1946 |
| 2,516,554 | Coyne | July 25, 1950 |

FOREIGN PATENTS

| | | |
|---|---|---|
| 63,071 | Sweden | May 31, 1927 |
| 145,722 | Australia | Mar. 13, 1952 |
| 456,436 | Italy | Apr. 5, 1950 |